United States Patent [19]
Chuang

[11] Patent Number: 5,803,434
[45] Date of Patent: Sep. 8, 1998

[54] AUTOMATIC SHUT-OFF DEVICE FOR SINGLE LEVER TAP

[75] Inventor: Ming-Jung Chuang, Taipei, Taiwan

[73] Assignee: Top Valve Co., Ltd., Taipei, Taiwan

[21] Appl. No.: 788,263

[22] Filed: Jan. 24, 1997

[51] Int. Cl.[6] .............................. F16K 31/44; F16K 21/00
[52] U.S. Cl. .......................... 251/338; 251/247; 137/801
[58] Field of Search ............................ 137/801; 251/338, 251/247

[56] References Cited

U.S. PATENT DOCUMENTS

| | | | |
|---|---|---|---|
| 462,844 | 11/1891 | Knox | 251/338 |
| 885,056 | 11/1908 | Calder | 251/247 |
| 1,033,958 | 7/1912 | Sieben | 251/338 |
| 1,233,728 | 7/1917 | Tozier | 251/247 |
| 1,685,205 | 9/1928 | Stein | 251/338 |

*Primary Examiner*—A. Michael Chambers
*Attorney, Agent, or Firm*—Bacon & Thomas

[57] ABSTRACT

A single-lever tap closable by a load added thereon after pulling up a knob, wherein, the knob is provided with a pivot connector pivotally provided on the top of a main body and is coupled to an output valve, a force exertion portion is formed by extending of the pivot connector forwardly. When the knob is pulled up, by coupling of the pivot connector to the output valve, the tap is opened, and when it restores to the original position, the tap is closed. The tap is characterized in that the force exertion portion is provided with a load element and some weights render the force exertion portion to move gradually downwardly back to its original lower position, hence the pivot connector shuts the output val-

2 Claims, 4 Drawing Sheets

AUTOMATIC SHUT-OFF DEVICE FOR SINGLE LEVER TAP

BACKGROUND OF THE INVENTION

1. Field of the Invention

The present invention relates to an automatic shut-off single-lever tap which is turned off by a load added thereon, the lever automatically moving down for closing of the tap after it is pulled up for use, thereby avoid non-stop flowing of water due to neglect of a user in forgetting to turn off the tap.

2. Description of the Prior Art

A single-lever tap means that controls outflow of water from the tap is controlled by a single lever. Tap handles in the earlier time utilized rotatable knobs to control opening and shutting of taps, because they were more troublesome in using and subjected to damage, a structure has been developed in the art to use a single pulling knob to control opening and shutting of a tap. When in use, a user has to pull the knob up to open the tap, and after using, the user shall press the pulling knob to close the tap. Such structure using a pulling knob to control opening and shutting of the tap is really simpler and convenient in use. However, some people still forget to press close the knobs after use, so waste is induced, particularly in public facilities, such case often occurs, especially by virtue of some people lacking in social morality. Persons in the art have developed various automatically shut-off taps in the recent years, these taps are divided into two kinds:

1. Taps that are controlled for opening and shutting with an infrared ray device. When a user put a hand under the tap, by sensing of the infrared ray device, an electromagnetic water outflow valve in the tap can be activated; after using and leaving of the user. The electromagnetic water outflow valve can restore its original position for closing, therefore, forgetting to shut water of the user inducing non-stop water outflowing can be avoided. Such tap costs quite high, it must be accompanied with electric device in mounting, and thereby is time and man work consuming, yet an electromagnetic water outflow valve is subjected to damage by short circuit due to water permeation.

2. Taps that can restore its unused position with an elastic element. When a user presses or pulls up a pulling knob, the tap can be opened and also an elastic element in the tap can be compressed or stretched, by means of the elastic restoring force of the compressed or stretched elastic element, the pulling knob can restore its original shut-off position. Such tap structure having the elastic element therein occupies larger volume, yet elements of the original interior parts in the tap must be change. The original elements are almost useless after a period of use, and the elastic element is subjected to elastic fatigue, and uncomplete closing can be induced.

SUMMARY OF THE INVENTION

From the above statement, the two kind of conventional automatically shut-off taps sold in the markets have their structural defects, changing of the original interior structures is necessary, this results in expensive production cost. In view of this, the inventor of the present invention studied and developed positively the structures of the automatically shut-off taps in order to get rid of the defects resided in the conventional techniques for achieving the objects of practicality and convenience, and provides an automatically shut-off single-lever tap which is turned off by a load added thereon after continuous study and improving, which tap can have the expected effects of automatical shut-off, cost reducing as well as durability.

Particularly, the automatically shut-off single-lever tap turned off by a load added thereon of the present invention has a pulling knob on the top thereof, the pulling knob is provided with a pivot connector on the top of a main tap body and being coupled to a water output valve, a force exertion portion is extended forwardly from the pivot connector, when in use, the force exertion portion is pulled upwardly, then the pivot connector couplingly in turn activates the water output valve, and when the force exertion portion restores to its original position, the water output valve is closed; characteristic of the present invention is that the force exertion portion fixedly provides a load element on the front end of the pulling knob, when the pulling knob is pulled upwardly, the load element and the weight therein can render the force exertion portion of the knob to move down gradually, till the pulling knob restores its original position, the water output valve is completely closed, no further water flows out, the effect of automatical shut-off of the tap can thereby be achieved.

The present invention will be apparent in its practical structure and characteristics after reading the detailed description of the preferred embodiments thereof with reference to the accompanying drawings.

DETAILED DESCRIPTION OF THE PREFERRED EMBODIMENT

Figure 1:
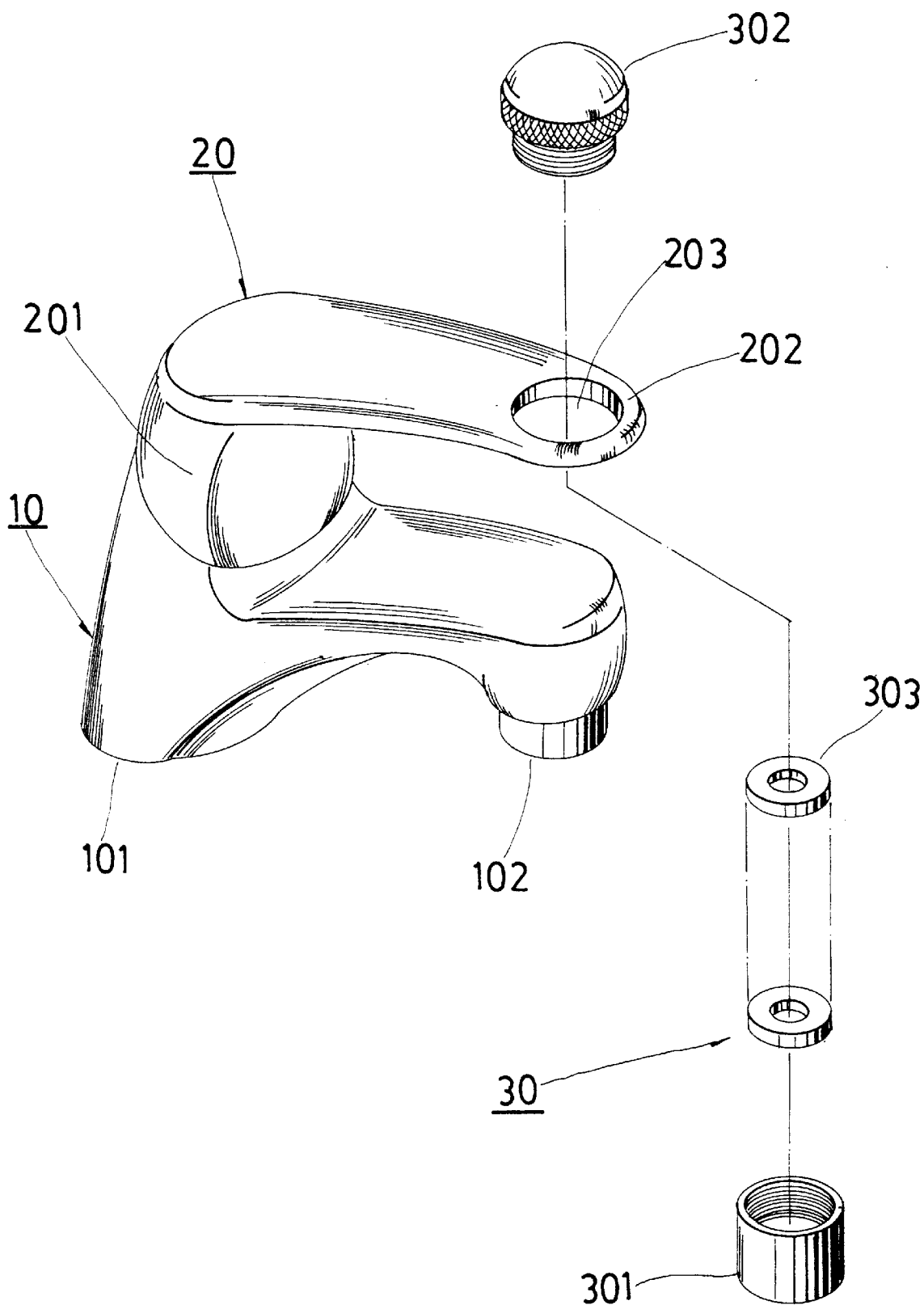
FIG. 1 is a schematic perspective view of the first embodiment of the present invention.

As shown in FIG. 1, the automatically shut-off single-lever tap turned off by a load added thereon of the present invention is comprised of a main body 10, an elongate pulling knob 20 having a front end and a rear end and a load element 30, wherein, the bottom of the main body 10 of the tap forms a water inlet 101 connectable to a water supply system, an outlet 102 is provided in the front thereof, a water output valve (not shown) is provided between the water inlet 101 and outlet 102 to control outflow of water in the water inlet 101 from the water outlet 102. The rear end of pulling knob 20 is provided with a pivot connector 201 which is pivotally provided on the top of the main body 10 of the tap and is coupled to the water output valve of the main body 10 to open or close the latter; a force exertion portion 202 is formed at the front end of knob 20. The load element 30 further includes a receptacle 301 and a decoration lid 302, the receptacle 301 can receive therein lead ingots or weights 303 etc., and is secured on the force exertion portion 202; the decorative lid 302 can cover the top of the receptacle 301, when in practice, it can be fixedly mounted in an aperture 203 provided on the front end of knob 20.

Figure 2:
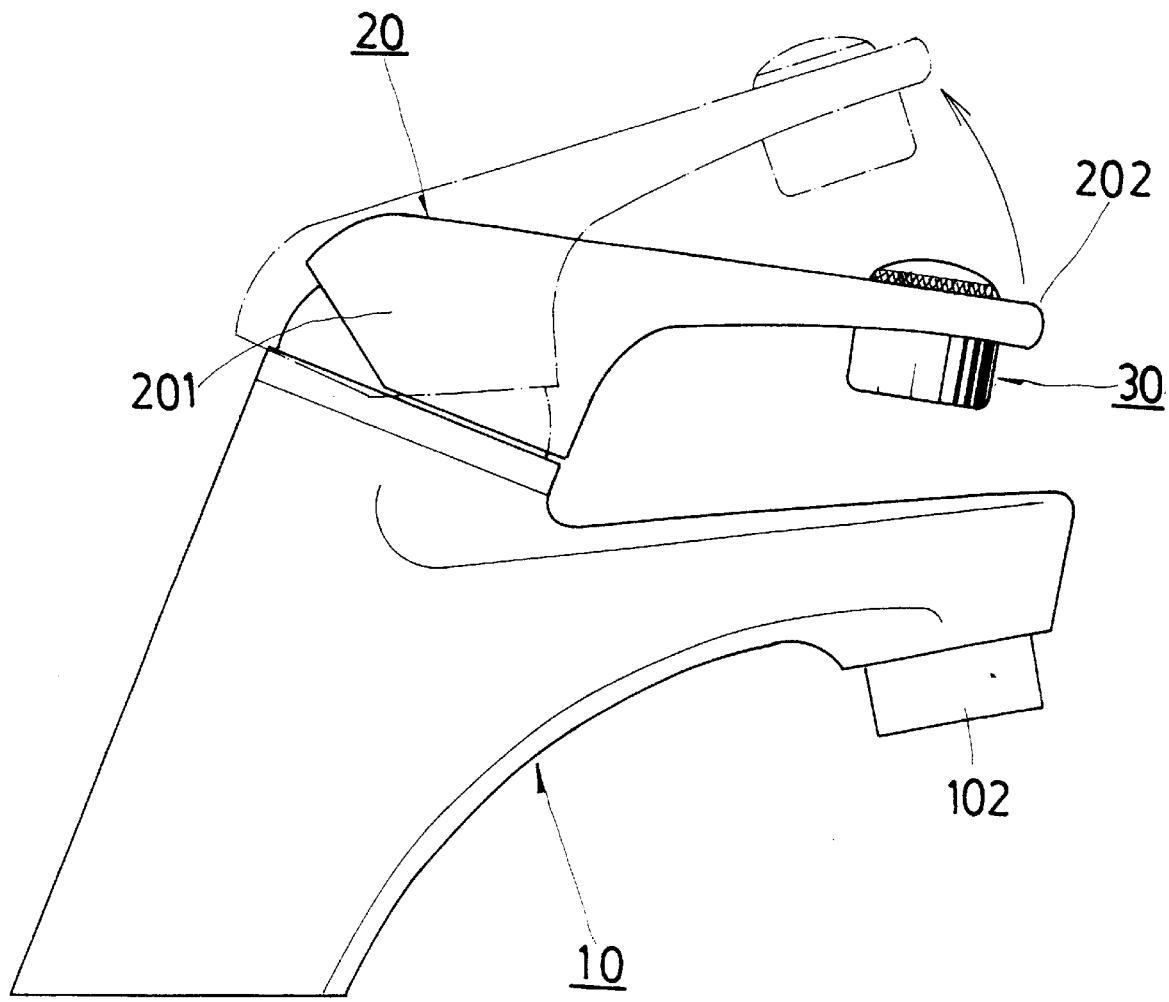
FIG. 2 is a schematic view of the present invention showing the action from closing to opening of the first embodiment of the present invention.

As shown in FIG. 2, before the automatically shut-off single-lever tap of the present invention is used, the force exertion portion 202 fixedly providing the load element 30 is located at its bottom position whereat the water output valve of the main body 10 pivotally connected with the pivot connector 201 is closed, so that water can not flow out of the water outlet 102. When in use, force is exerted upwardly on the front end of knob 20 to move the latter upwardly, then the pivot connector 201 is coupled to the water output valve of the main body 10 to open the latter, so that water flowing into the main body 10 from the water inlet 101 can flow out of the water outlet 102, until the front end of knob 20 moves downwardly back to its original position to shut the water output valve again and terminate flow through the outlet.

Figure 3:
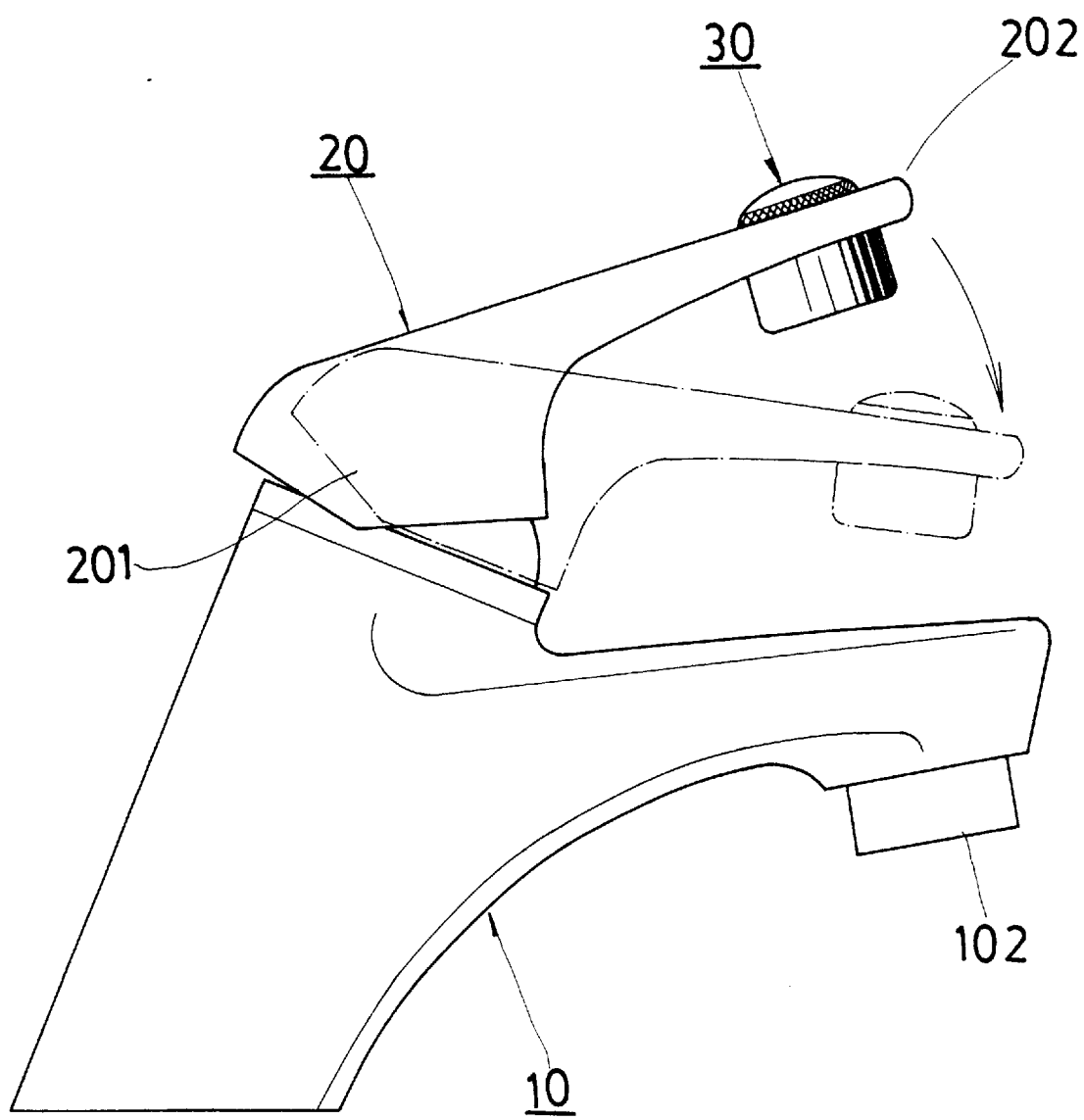
FIG. 3 is a schematic view of the present invention showing the action from opening to automatic closing of the first embodiment of the present invention.

Referring to FIG. 3, when the main body 10 is opened to put out water, the force exertion portion 202 of the pulling knob 20 is at a higher position, at this time, the load element 30 having sufficient weight will render by its gravity the force exertion portion 202 and the front end of knob 20 to bear a downward action force to move slowly downwards, until they move back to their lower position, then the main body 10 is closed to stop flowing of water out of the water outlet 102, thereby, the function of automatic shut-off of the tap can be achieved.

Figure 4:
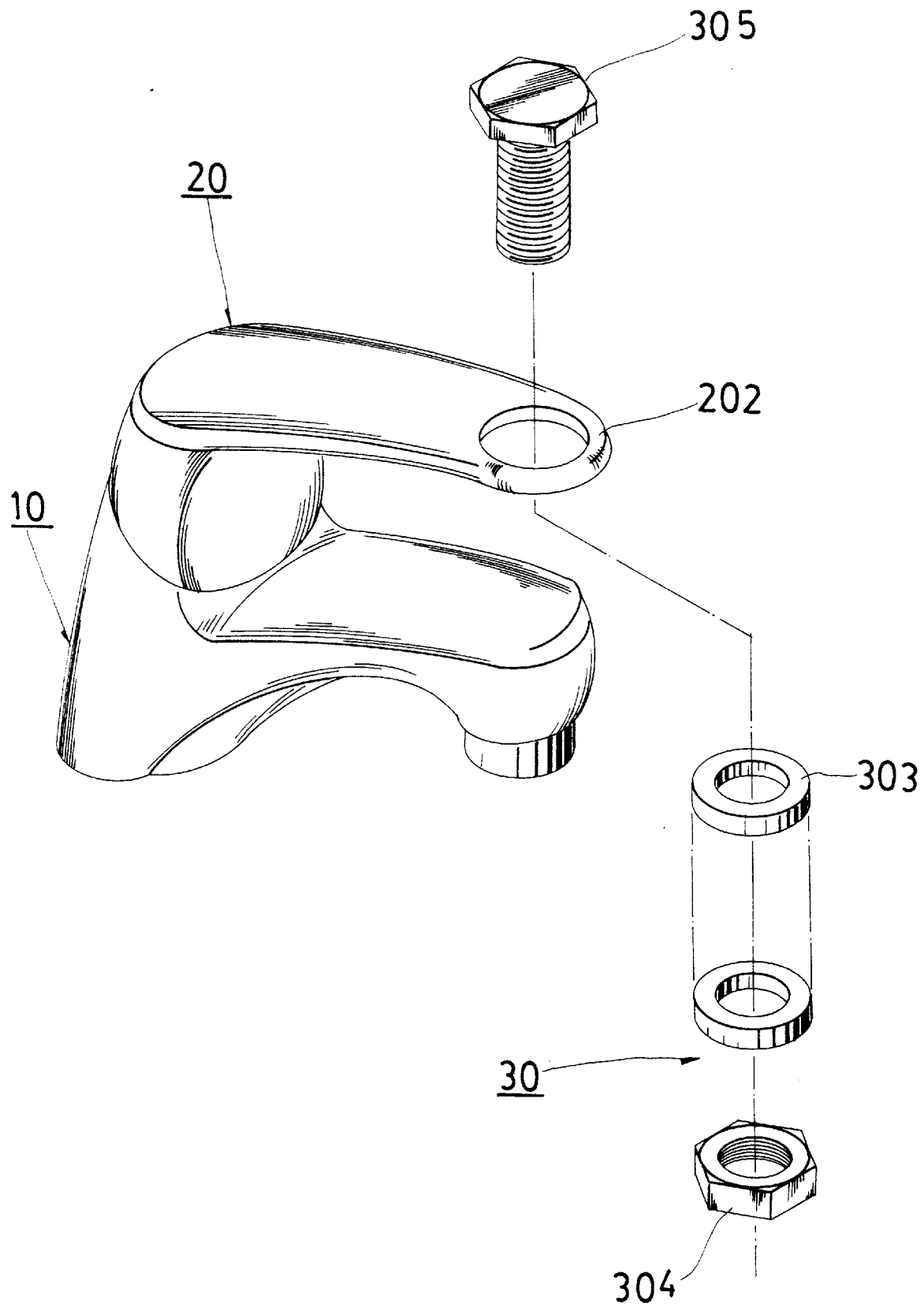
FIG. 4 is an exploded perspective view of the second embodiment of the present invention.

Referring to FIG. 4, in practice of the load element 30, components therein are not limited to the aforesaid receptacle 301 and decorative lid 302. A nut 304 and a bolt 305 can be used instead, weights 303 can be slipped over the bolt 305 and then the bolt 305 and the weights 303 can be secured on the force exertion portion 202 at the front end of the pulling knob 20 with the nut 304; further the load element 30 and the weights 303 can be formed integrally, and are welded to or screwed on the force exertion portion 202.

The present invention has the advantages of:

1. When in assembling, the load element 30 is conveniently secured directly on the force exertion portion 202 of the pulling knob 20, so there is no requirement of an electric device in mounting as is the case of a conventional infrared ray sensing tap, 2. When in production, the original interior parts in the tap do not have to be changed, the function of automatic shut-off of the valve can be effected after use, and cost can be reduced.

3. When in using, by the weight of the load element 30, the tap can be automatically shut off, and no defect of circuit shorting of an electromagnetic valve or fatigue of an elastic element is realized, so this can prolong life of use thereof.

The above mentioned elements are only for convenience of description of the present invention, it is apparent for the persons skilled in the art that various changes and modifications might be made without departing from the scope of the invention which is set forth in the accompanying claims.

I claim:

1. An automatic shut-off device for a water tap having a main body that includes a water inlet, a water outlet and a lever for operating a flow control valve, the lever having a front end for grasping by a user and a rear end pivotally mounted to the main body, whereby the lever is movable between an upper position in which water flow through the outlet is permitted and a lower position in which water flow through the outlet is terminated, the device comprising a load assembly mounted to the front end of the lever, the load assembly being of sufficient weight to move the lever from the upper position to the lower position under the force of gravity after the lever has been disposed in the upper position by the user, thereby automatically terminating flow through the outlet, wherein the load assembly includes a receptacle, at least one weight element disposed within the receptacle and a decorative lid covering the receptacle wherein the front end of the lever includes an aperture, the decorative lid includes a threaded portion extending through the aperture, and the receptacle includes an inner threaded portion disposed in threaded engagement with the threaded portion of the decorative lid to thereby attach the receptacle to the lever.

2. An automatic shut-off device for a water tap having a main body that includes a water inlet, a water outlet and a lever for operating a flow control valve, the lever having a front end for grasping by a user and a rear end pivotally mounted to the main body, whereby the lever is movable between an upper position in which water flow through the outlet is permitted and a lower position in which water flow through the outlet is terminated, the device comprising a load assembly mounted to the front end of the lever, the load assembly being of sufficient weight to move the lever from the upper position to the lower position under the force of gravity after the lever has been disposed in the upper position by the user, thereby automatically terminating flow through the outlet wherein the load assembly includes an aperture formed in the front end of the lever, a bolt extending through the aperture, at least one weight element received on the bolt and a nut in threaded engagement with the bolt to retain the at least one weight element thereon.

* * * * *